United States Patent [19]
Darwood

[11] 3,979,560
[45] Sept. 7, 1976

[54] TELEPHONE ANSWERING SYSTEM WITH RING DETECTOR

[75] Inventor: James R. Darwood, Cerritos, Calif.

[73] Assignee: T.A.D. Avanti, Inc., Paramount, Calif.

[22] Filed: Mar. 10, 1975

[21] Appl. No.: 556,649

Related U.S. Application Data

[63] Continuation-in-part of Ser. No. 482,452, June 24, 1974, abandoned.

[52] U.S. Cl. ............................ 179/6 R; 179/84 R
[51] Int. Cl.² ....................................... H04M 11/10
[58] Field of Search ........ 179/2 A, 6 R, 6 E, 6 AC, 179/84 R

[56] References Cited
UNITED STATES PATENTS

| | | | |
|---|---|---|---|
| 2,925,279 | 2/1960 | Fontaine | 179/6 R |
| 3,337,690 | 8/1967 | Martin | 179/6 R |
| 3,592,968 | 7/1971 | Ogawa | 179/6 R |
| 3,679,831 | 7/1972 | Bonsky | 179/6 R |

Primary Examiner—Bernard Konick
Assistant Examiner—Alan Faber
Attorney, Agent, or Firm—Keith D. Beecher

[57] ABSTRACT

A telephone answering system is provided which includes an automatic ring delay circuit which sets the system so that the first call received after the system has been turned on requires four rings, for example, to activate the system, and all subsequent calls require but two rings, for example. The telephone answering system also includes an oscillator circuit which is momentarily energized at the end of an announcement interval so as to generate a beep signal to the calling party to notify the calling party that the system is now in condition to record his message.

3 Claims, 3 Drawing Figures

TELEPHONE ANSWERING SYSTEM WITH RING DETECTOR

This application is a continuation-in-part of copending application Ser. No. 482,452, filed June 24, 1974, now abandoned.

BACKGROUND OF THE INVENTION

Telephone answering systems in general are well known to the art. Such systems respond to an incoming telephone ring signal to transmit a recorded announcement to a calling party during a first time interval T-1, and then automatically to enter a message recording mode during a second time interval T-2 during which a message from the calling party is recorded.

The telephone answering system of the present invention includes an automatic ring delay circuit which sets the system so that the first call received after the system has been turned on requires a greater number of rings than subsequent calls. This means that the user can turn the system on while he is present, and so long as he answers his calls before the predetermined number of rings, the system will not answer or record the calls. However, if the user so desires, even when present, he can permit the predetermined number of rings to occur for an incoming call, so that the system will answer and record the call. Then, the system automatically sets itself so that for all subsequent calls, it requires a lesser number of rings.

While the user is present, he would usually turn off the system, or he would answer the telephone before the predetermined number of rings occurred, so that the system normally would remain set to the higher number of rings, before it became effective. Then, should the user leave the office, he need not make any adjustments to the system, and in his absence, the system will automatically set itself, after the first call, to answer all subsequent calls on a fewer number of rings, so as to avoid any likelihood of the calling party hanging up before the instrument answers.

The telephone answering system of the invention also includes an improved and simplified "beep" generating circuit, which is effective to transmit a short beep tone to the calling party at the end of the T-1 announcement interval, to inform the calling party that the system is now ready for his message. A simplified oscillator circuit is provided which is excited for a brief moment by the charge on a capacitor, the charge being acquired by the capacitor during the T-1 announcement interval.

DETAILED DESCRIPTION OF THE ILLUSTRATED EMBODIMENT

Figure 1:
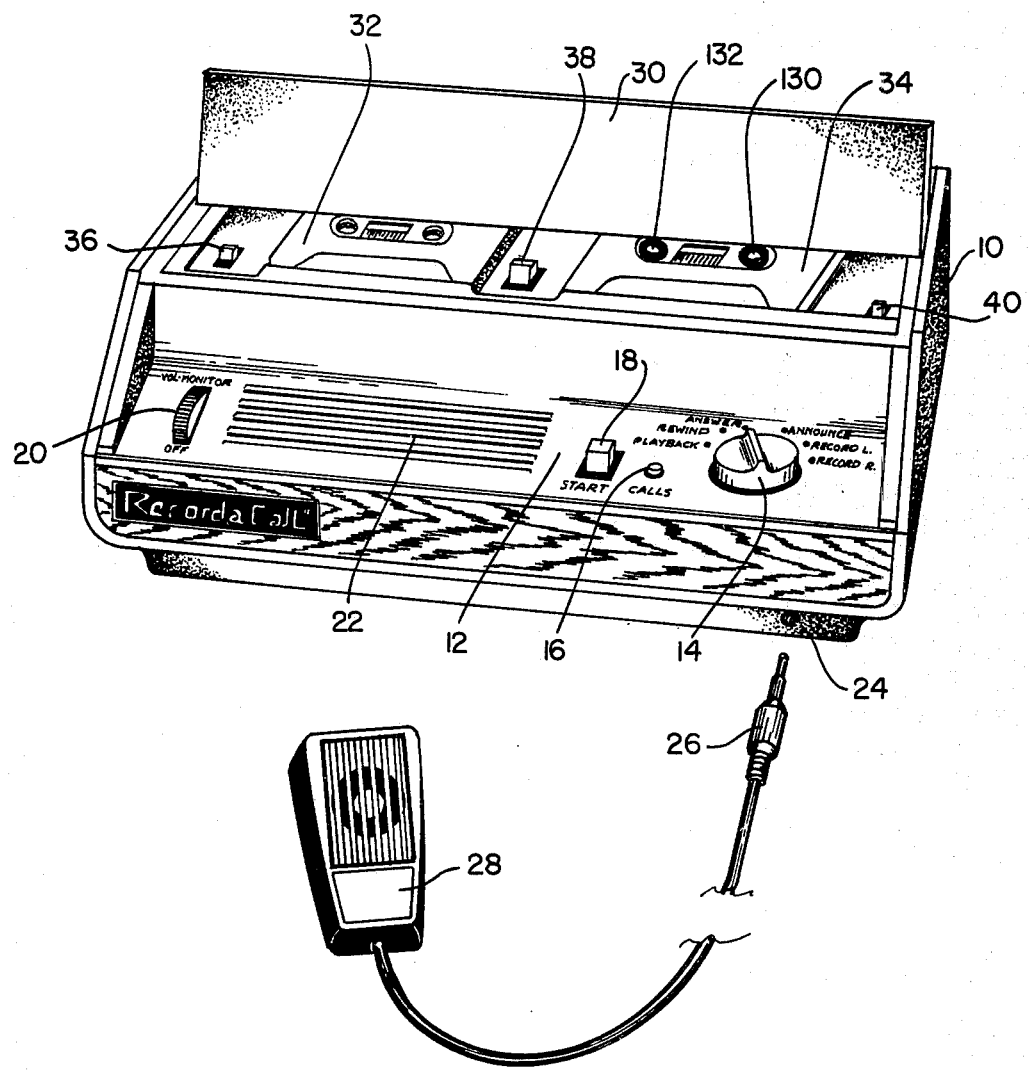
FIG. 1 is a perspective representation of a telephone answering instrument such as described in Copending Application Ser. No. 548,413, and which may incorporate the improved system of the present invention.

The telephone answering instrument shown in FIG. 1 is of the type described in copending application Ser. No. 548,413, filed Feb. 10, 1975 in the name of the present inventor. It is constructed for direct use in conjunction with the telephone line, and it may be plugged into a usual telephone jack by an appropriate telephone connecting cord or cable. The instrument is energized from the usual domestic alternating current power source, and a typical power cord is also provided for plugging the unit into the domestic power receptacle.

The instrument shown in FIG. 1 includes a casing 10 having a control panel 12 extending along its forward edge. A control knob 14 is rotatably mounted on the control panel 12, and it controls a multi-section rotary switch. The rotary switch may be set to six different positions, indicated respectively as "Playback", "Rewind", "Answer", "Announce", "Record 1" and "Record 2".

A call light 16 is mounted on the control panel 12, and this call light is illuminated whenever a call is received by the instrument. A start button 18 is also mounted on the control panel 12, which, when depressed, operates a switch to place the instrument in operation, just as if a telephone call were received. Also, a combined on-off power switch and volume control 20 is mounted on the control panel 12. The instrument includes a speaker which is mounted behind a grill 22 on panel 12, and it also includes a microphone jack 24 which receives the plug 26 of a microphone 28.

The top of the casing 10 has a hinged lid 30 which may be opened to permit access to a pair of cassette-type tape units designated 32 and 34. The cassette tape unit 32 contains a loop of magnetic tape which bears the recorded announcement which is transmitted to the calling parties during the first time interval T-1 after each call is received, and which announcement may be changed from a remote source by the control circuit of the invention, as will be described. The casette tape unit 34 contains a reel of magnetic tape which is drawn onto a take-up reel to record the messages from the calling parties which are received during each time interval T-2 following the corresponding announcement interval T-1.

A lever 36 is provided which permits the removal of the announcement cassette 32. An erase lever 38 is provided which, when operated during the rewind mode of the tape in the message cassette 34, serves to erase the previous messages on the tape in the message cassette, as more fully described in copending application Ser. No. 548,413. A fast forward lever 40 is also provided which imparts a fast forward motion in the tape in the message cassette 34, as also described in application Ser. No. 548,413.

When the control knob 14 is turned to the Answer position, the telephone answering instrument is then set to answer incoming telephone calls automatically, and to transmit the announcement recorded on the magnetic announcement tape in cassette 32 to a calling party during the time interval T-1, and subsequently to record the message from the calling party on the message tape in cassette 34 during the following time interval T-2.

When the control knob 14 is turned to the Rewind position, the message tape in cassette 34 is driven in the reverse direction so that it may be rewound to its original position. When the control knob 14 is turned to the Playback position, the message tape in the cassette 34 will move in the forward direction so that the messages previously recorded on the tape may be played and reproduced through a speaker mounted behind the grill 22.

Whenever a telephone call is received by the instrument, the call light 16 is illuminated, so that the operator may turn the control knob 14 to Rewind and return the message tape to its original position, and then he may turn knob 14 to the "Playback" position and play back the messages which have been received and recorded on the message tape. When the control knob 14 is turned to the Announce position, the telephone answering instrument will answer the telephone, and it will transmit the announcement on the announcement tape in cassette 32 to the calling parties. However, it will not record any incoming messages.

Any desired announcement may be recorded on the announcement tape in cassette 32 by turning the control knob 14 to the Record 1 position, by plugging the plug 26 into the microphone jack 24, and by speaking into the microphone 28. Likewise, the instrument may be used as a dictating machine, or for other recording purposes, by setting the control knob 14 to the Record 2 position, and by recording dictation, or other information on the message tape in cassette 34 through the microphone 28. This latter setting of the control knob 14 also permits the operator to record two-way conversations received over the telephone.

In the following discussion, the outgoing announcement tape will be referred to as the T-1 tape. This tape is in the form of a loop contained in cassette 32 of FIG. 1. The loop contains a short piece of metal foil which comes in contact with the surfaces of switch SC1 in FIG. 2 as the announcement tape rotates, and provides an indication of the origin position of the announcement tape. The incoming message tape, which is contained in the cassette 34 of FIG. 1 will be referred to as the T-2 tape, the cassette 34 being a standard cassette cartridge.

During the T-1 announcement mode during which the T-1 announcement tape is operating and transmitting the recorded announcement over the telephone line, a drive motor M-1 is energized, as is a control solenoid SD-1. When the solenoid SD-1 and motor M-1 are energized, the T-1 tape is caused to turn. After one complete loop during the operation of the T-1 tape, the metal foil will contact the switch CS1 to terminate the T-1 announcement mode. The system will be capable of entering the T-1 announcement mode when the control knob 14 is set to its Answer, Announce, or Record 1 positions.

At the end of the T-1 announcement mode, the motor M-1 continues to operate, but the solenoid SD-1 is de-energized and the solenoid SD-2 is energized. This causes the T-1 announcement tape in cassette 32 to stop, and the T-2 message tape in cassette 34 to move in its forward mode to record the incoming message. The system is capable of entering the T-2 operational mode when the knob 14 is set to its Playback, Answer or Record 2 positions. When the control knob 14 is placed in the Rewind position, both solenoids SD-1 and SD-2 are de-energized, and a solenoid SD-3 is energized which serves to place the cassette 34 in a high speed rewind mode. This operation is discussed in detail in copending application Ser. No. 548,413.

The power supply is composed of a power cord designated P-1 which is connected to the primary of a power transformer T-1. A pair of diodes D22 and D23 are connected to the secondary of the transformer, and a filter capacitor C38 is connected to the center tap of the secondary and to the cathodes of the two diodes. The capacitor C38 is a 2200 microfarad capacitor, and it constitutes the main filter capacitor for the power supply.

Figure 2A:
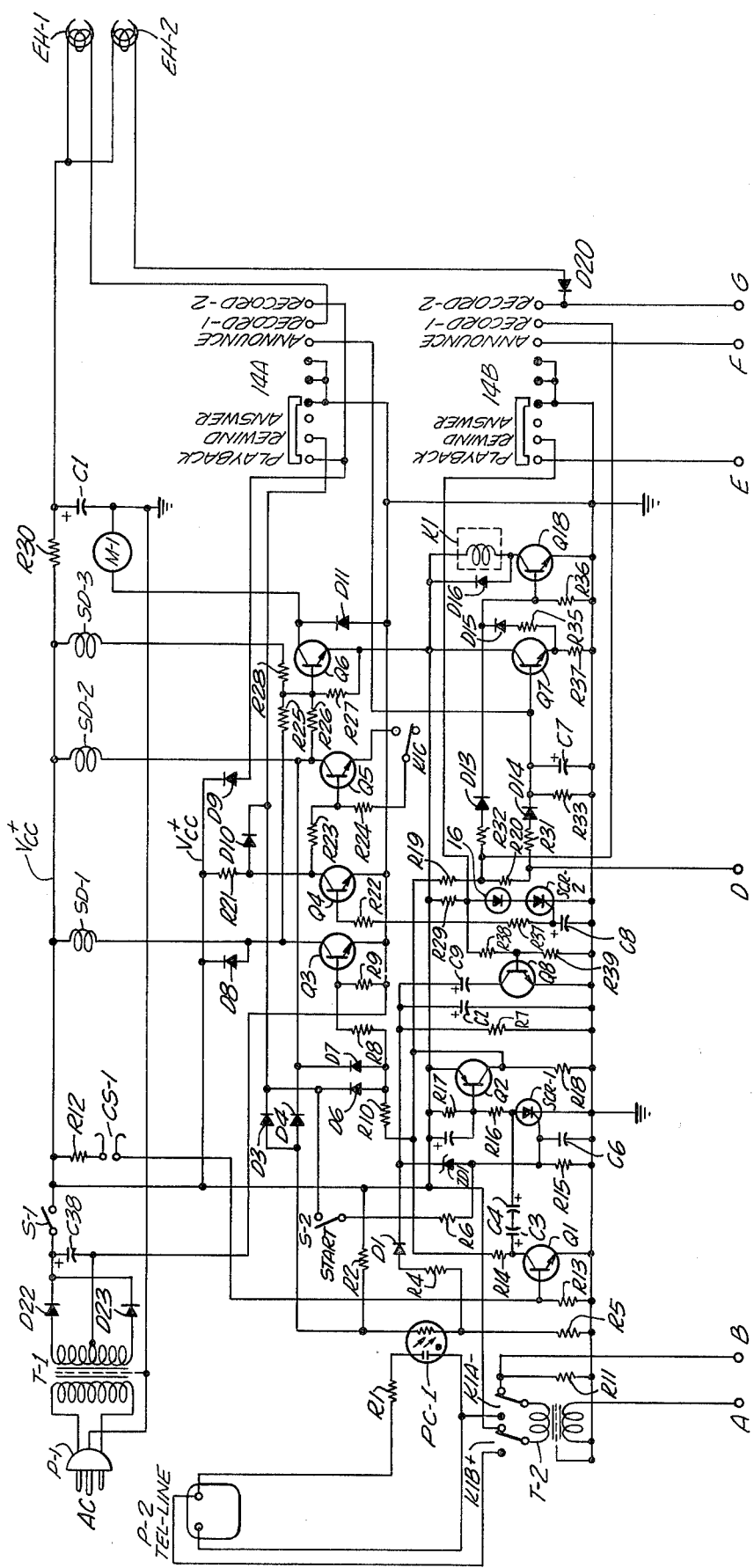
FIGS. 2A and 2B collectively represent a schematic diagram of the electronic portion of the telephone answering system representing one embodiment of the invention.

Direct current power is applied to the lead designated $V+_{cc}$ when a power switch S-1 is closed. The power line is connected through a 1.5 kilo-ohm resistor R30 and to a shunting filter capacitor C1 of 100 microfarads to supply ripple-free direct current to a pair of erase heads designated EH-1 and EH-2. The erase head EH-1 is magnetically coupled to the T-1 announcement tape in the cassette 32 of FIG. 1, and the erase head EH-2 is magnetically coupled to the T-2 message tape in the cassette 34. The power switch S-1 physically is part of the volume control 20 of FIG. 1. As shown in FIG. 2A, the solenoid SD-1 is shunted by a diode D8, and the solenoid SD-2 is shunted by a diode D9.

The usual telephone receptacle is designated P-2, and it connects to the five telephone leads, namely: tip (T), ring (R), and ring ground (RG). In normal configuration the ring ground (RG) is connected to the ring (R) lead. The (RG) lead is connected through a 150 ohm resistor R1 to a neon lamp in a module designated PC-1. The module PC-1 is a lamp/photoresistor module, which may be of the type presently marketed under the designation "Vatec VTL-3B48". The tip lead (T) is connected to the other terminal of the neon lamp. Resistor R1 insures that the ring detection circuit appears as a high impedance to the telephone line.

When a ring voltage is received over the telephone line, the neon lamp within the module PC-1 is illuminated, causing the photoresistor within the unit to decrease in resistance from approximately 5 megohms to 1 kilo-ohm. This photoresistor is connected through a pair of resistors R3 and R2 to the positive potential lead $V+_{cc}$. Each of these resistors may have a resistance, for example, of 560 ohms. The other terminal of the photoresistor for example, of 560 ohms. The other terminal of the photoresistor in the module PC-1 is connected to grounded resistor R5 which may, for example, have a resistance of 5.6 kilo-ohms. During idle conditions the voltage across the resistor R5 is approximately zero. During each ring cycle, however, this voltage increases to approximately 10 volts.

The junction between resistor R5 and the photoresistor in module PC-1 is also connected through an 8.2 kilo-ohm resistor R4 and through a diode D1 to a grounded capacitor C2 of, for example, 100 microfarads, and to a grounded resistor R7 of, for example, 470 kilo-ohms. Capacitor C2 is charged during each ring cycle by way of the resistor R4 and diode D1. When the voltage across the capacitor D2 reaches approximately 5 volts, which usually occurs after two ring cycles, a Zener diode ZD1 will conduct, triggering the gate of a silicon controlled rectifier SCR1. The gate of the silicon controlled rectifier is connected to a grounded 10 kilo-ohm resistor R15 which is shunted by a 4.7 microfarad capacitor C6. The firing of the silicon controlled rectifier SCR1, as will be described, initiates the announcement mode T-1, during which the recorded announcement is transmitted over the telephone line to the calling party. The capacitor C2 then discharges during the T-1 announcement mode through the resistor R7.

The circuit includes an NPN transistor Q8 having a grounded emitter, and whose collector is connected to a 47 microfarad capacitor C9 which, in turn, is connected to the capacitor C2. The base of the transistor Q8 is connected to a grounded 1 kilo-ohm resistor R39 and to a 4.7 kilo-ohm resistor R38. The transistor Q8, capacitor C9 and resistors R38 and R39 are used to obtain "automatic ring delay". On the first call after the unit has been turned on or reset, transistor Q8 is conductive, and this places capacitor C9 in parallel with capacitor C2, thus doubling the available ring delay to approximately 4 ring cycles. However, on all calls after the initial call, until reset, transistor Q8 is non-conductive, thus disabling the additional ring delay, and reducing the ring delay to approximately 2 ring cycles.

Such a control sets the system so that the first call received after the system has been turned on requires a greater number of rings than subsequent calls. This means that the user can turn the system on while he is present, and so long as he answers his calls before the predetermined number of rings, the system will not answer or record the calls. However, if the user so desires even when present, he can permit the predetermined number of rings to occur for an incoming call, so that the system will answer and record the call. Then, the system automatically sets itself so that for all subsequent calls, it requires a lesser number of rings.

The junction of the resistors R2 and R3 is connected through a diode D3 to the T-2 message tape reverse solenoid SD-3, and through a diode D4 to the message tape solenoid SD-1. These diodes perform interlock functions to assure that the ring detection circuit will not operate during the Playback, Rewind or Record 2 modes, during which time a ground is applied, as will be described to the corresponding terminals of either the solenoid SD-2 or SD-3.

When the proper number of rings have been received, either during the initial stage when both the capacitors C1 and C2 are in the ring detection circuit, or during subsequent calls when only the capacitor C1 is in the ring detection circuit, the silicon controlled rectifier SCRL is fired to initiate the T-1 announcement mode. The gate of the silicon controlled rectifier SCR1 is also connected to the start switch 18 through a 47 ohm resistor R6 so that the announcement mode can also be initiated by closing the start switch. The start switch is also connected to the interlock relay D3 to prevent the system from entering the T-1 announcement mode whenever it has been placed in any of the modes referred to in the preceding paragraph.

The base of the silicon controlled rectifier SCR1 is grounded, and the anode is connected through a pair of resistors R16 and R17 to the positive V+$_{cc}$ lead. The resistor R16 may have a resistance of 1 kilo-ohm, and the resistor R17 has a resistance of 330 ohms. The resistor R15 provides thermal stability for the silicon controlled rectifier SCR1, and the capacitor C6 insures that transients will not trigger the silicon controlled rectifier.

The junction of the resistors R16 and R17 is connected to a PNP transistor Q2. The base of the transistor Q2 is connected to the positive lead V+$_{cc}$, and the collector is connected to a grounded 560 ohm resistor R18. The emitter of the transistor Q2 is connected through a 4.7 kilo-ohm resistor R22 to the base of an NPN transistor Q4. The emitter of the transistor Q4 is grounded and the collector is connected through a 470 ohm resistor R21 to the positive lead V+$_{cc}$. A capacitor C43 is connected to the emitter and base of transistor Q2. The resistor R17 provides thermal stability for the transistor Q2, and the capacitor C43 provides a short 200 millisecond delay in the rendering of the transistor Q2 conductive. The collector of the transistor Q2 is also connected to a PNP transistor Q3 through a 470 ohm resistor R10 and through a 540 ohm resistor R8.

The junction of the resistors R10 and R8 is connected to the cathodes of diodes D3 and D4 through respective diodes D8 and D7. The base of the transistor Q3 is connected to a grounded 470 ohm resistor R9, its emitter is grounded, and its collector is connected to the solenoid SD-1.

When the transistor Q2 is rendered conductive, its collector voltage will approach the supply voltage V+$_{cc}$, and this will cause the transistor Q3 to become conductive by way of resistors R8 and R10. The resistor R9 provides thermal stability for the transistor Q3. When the transistor Q3 is rendered conductive, the solenoid SD-1 is energized, and the announcement tape is driven by the motor M-1.

The collector of the transistor Q3 is also connected to the base of the PNP transistor Q6 through a 470 ohm resistor R25. The emitter of the transistor Q6 is connected to the positive lead V+$_{cc}$, and the base is connected to the emitter through a 330 ohm resistor R27. The collector of the transistor is connected to one terminal of the motor M-1, the other terminal of which is grounded. The motor is shunted by a diode D11. When the transistor Q3 is rendered conductive to energize the solenoid SD-1, the transistor Q6 is also rendered conductive by way of the resistor R25 to cause the motor M-1 to operate, and the T-1 announcement tape to begin to turn.

The switch CS1 is connected to a grounded 10 kilo-ohm resistor R13 and to a 1 kilo-ohm resistor R12. The latter resistor is connected to the positive terminal V+$_{cc}$. The resistor R13 is connected to the base of an NPN transistor Q1, whose emitter is grounded. The collector of the transistor Q1 is connected through a 470 kilo-ohm resistor R14 to the resistor R10. The collector is also connected to a 10 microfarad coupling capacitor C3 which, in turn, in connected to a 10 microfarad coupling capacitor C4. The latter capacitor is connected to the anode of the silicon controlled rectifier SCR1.

When the T-1 announcement tape turns to a point where its metal foil no longer contacts the switch CS1 which occurs in approximately half a second, the transistor Q1 is rendered non-conductive, and the capacitors C3 and C4 now begin to charge by way of the resistor R14. This charging time takes about five seconds. At the end of the T-1 announcement cycle, the metal foil on the T-1 announcement tape will again contact thw switch CS1, which will cause the transistor Q1 quickly to be rendered conductive. When that occurs, the charged capacitors C3 and C4 drive the anode of the silicon controlled rectifier SCR1 below ground potential, thus permitting the silicon controlled rectifier to be rendered non-conductive. When the silicon controlled rectifier SCR1 is rendered non-conductive, the transistor Q2 is rendered non-conductive, as is the transistor Q3, thereby causing the solenoid SD-1 to be de-energized so as to stop the T-1 announcement tape.

When the transistor Q2 is rendered conductive at the beginning of the T-1 announcement mode, it also renders the transistor Q4 conductive by way of the resistor R22. The transistor Q4 is connected to the base of an NPN transistor Q5 through a 560 ohm resistor R23, and through a diode D10 to the cathode of the interlock diode D3. The base of transistor Q5 is also connected to a 1 kilo-ohm grounded resistor R24. The collector of the transistor Q5 is connected to the solenoid SD-2, and through a 470 ohm resistor R26 to the transistor Q6. The emitter of the transistor Q5 is connected through a pair of normally open contacts K1C to ground, these contacts being closed during the T-1 announcement mode. The conductivity of the transistor Q4 during the T-1 announcement mode inhibits the operation of the transistor Q5, thus insuring that the solenoid SD-2 cannot be activated during the T-1 mode, so that there is no possibility of movement of the T-2 message tape during the announcement mode.

The collector of the transistor Q2 is also connected through a 470 ohm resistor R19, through a 2.2 kilo-ohm resistor R32, and through a diode D13 to the base of an NPN transistor Q18. The base of the transistor Q18 is connected to a grounded 4.7 kilo-ohm resistor R36, the emitter of the transistor is grounded, and its collector is connected to the coil of a relay K1, whose other terminal is connected to the positive lead $V+_{cc}$. The coil of the relay K1 is shunted by a diode D16.

During the T-1 announcement mode when the transistor Q2 is rendered conductive, the transistor Q18 is also rendered conductive to energize the relay K1. The diode D13, and a further diode D15 form a gate circuit, so that the transistor Q18 will be held conductive during the announcement mode when the transistor Q2 is conductive, or whenever the timer circuit of the transistor Q7 and capacitor C7 is charged and operating. The capacitor C7 has a capcity, for example, of 220 microfarads. It is connected to ground, and through a diode D14 to a 1 kilo-ohm resistor R31. The capacitor is also connected to a grounded 100 kilo-ohm resistor R33. The collector of the transistor Q7 is connected to the positive terminal $V+_{cc}$, and the emitter is connected to a grounded 4.7 kilo-ohm resistor R34. The emitter is also connected through a 4.7 kilo-ohm resistor R35 to the diode D15.

The junction of resistors R10 and R14 is connected through the resistor R19 to the resistor R32, and through a 330 ohm resistor R20 to the resistor R31. This connection causes the capacitor C7 to be charged during the T-1 announcement mode by way of the resistor R31 and diode D14. When the capacitor C7 is charged, the transistor Q7 is rendered conductive, and its emitter voltage is used to render the transistor Q18 conductive by way of the resistor R35 and diode D15, to energize the relay K1. The resistor R33 in conjunction with the capacitor C7 determines the length of time the relay K1 will remain energized after the termination of the announcement mode. The diode D16 connected across the coil of relay K1 suppresses transients and protects the transistor Q18.

Therefore, when the ring signal appears across the (RG) and (T) terminals, the module PC-1 is activated to render the transistor Q2 conductive, which, in turn, renders the transistors Q3 and Q6 conductive, as described above to energize the motor M-1 and the solenoid SD-1. The T-1 announcement tape now starts to move, so that the switch CS1 opens, and the transistor Q1 becomes non-conductive. The transistor Q8 then becomes conductive energizing the relay K1. When the relay K1 is energized, the relay contacts K1A and K1B close across the (T) and (R) terminals, connecting the transformer T2 to the telephone line. This permits the recorded announcement from the T-1 tape to be transmitted over the telephone line to the calling party.

At the end of the T-1 announcement interval, the system enters its T-2 message recording mode, during which the T-2 message tape is activated to record incoming messages. This occurs whenever a ground is placed on the lower terminal of the solenoid SD-2 which, at the same time, causes the transistor Q6 to become conductive to energize the motor M-1. As fully described in the copening application Ser. No. 548,413, the motor M-1 drives both the T-1 announcement tape and the T-2 message tape capstans, and the individual tape drive mechanisms are selectively activated by energizing the solenoids SD-1 or SD-2. As mentioned above, for rewind of the message tape T-2, the solenoid SD-3 is energized.

The selector knob 14 of FIG. 1 controls four individual switch sections 14A, 14B, 14C and 14D. When the selector knob is placed in either the Playback (P) or Record 2 (R-2) position, the switch section 14A places a ground on the lower terminal of the solenoid SD-2 to cause the solenoid SD-2 and the motor M-1 to be energized, which is desired during the Playback and Record 2 operations.

The lower terminal of the solenoid SD-2 is also grounded by way of relay contacts K1C and transistor Q5. The transistor Q5 is normally held in its conductive state by way of base current from the resistors R21 and R23. The resistor R24 provides thermal stability for the transistor Q5. The conductivity of the transistor Q5 is inhibited during the T-1 announcement mode by the transistor Q4, as described above; and its conductivity is inhibited during the rewind mode by the diode D10, this being achieved when the switch section 14A is moved to the Rewind position (R) which places a ground on the cathode of the diode D10 thereby clamping the junction of the resistors R21 and R23 to a 0.6-volts or less. This clamping voltage holds the base voltage of the transistor Q5 at a level below that necessary to cause the transistor to become conductive. Therefore, the circuitry described above assures that the solenoid SD-2 will be energized, together with the motor M-1, to move the T-2 message tape whenever the relay K1 is energized, except during the T-1 announcement mode or rewind mode.

One side of the motor M-1 is grounded directly to the chassis to insure minimum brush noise being introduced into the audio circuits of the system. As described in the copending application Ser. No. 548,413 the motor M-1 is driven in one direction, so that there is no need to switch its ground connection to the chassis. The diode D11 is a transient suppressor for the motor M-1, which protects the transistor Q6, as mentioned above. The transistor Q6 is in series with the motor M-1 to switch the positive power supply lead $V+_{cc}$ to the motor terminal. The resistor R27 provides thermal stability for the transistor Q6. The resistors R25, R26 and R28 form an "or" gate by which the transistor Q6 may be turned on during various operational modes, as described above. These resistors are connected to the ground terminals of the solenoids SD-1, SD-2 and SD3, so that if any of these solenoids is energized, the motor M-1 will operate simultaneously.

Figure 2B:
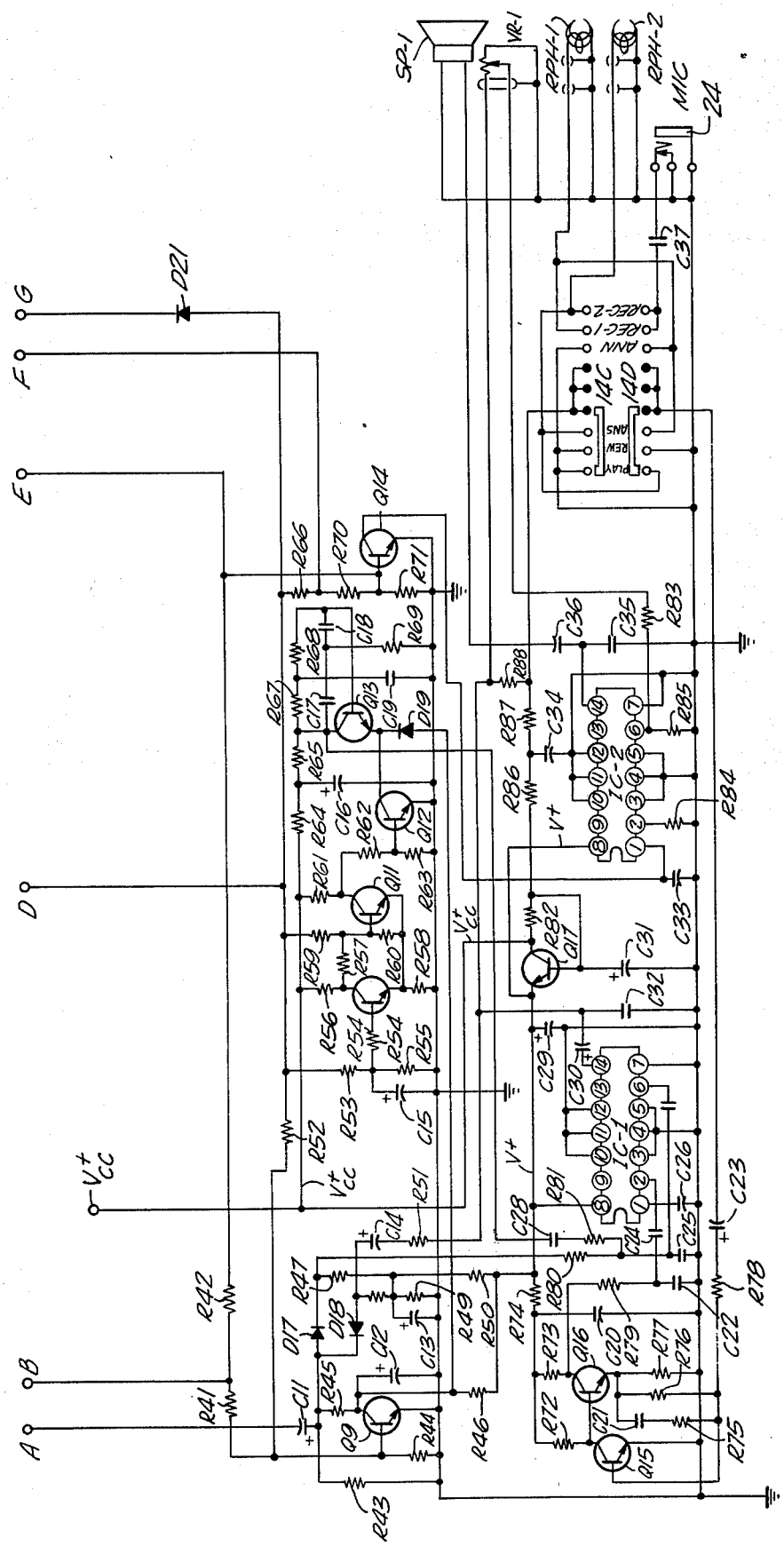

The call light 16 is a light emitting diode in the circuit of FIG. 2 and it is connected to the anode of a silicon controlled rectifier SCR2, and through a 560 ohm resistor R29 to the lead $V+_{33}$. The cathode of the silicon controlled rectifier SCR2 is grounded, and its gate is connected to a 4.7 kilo-ohm resistor R37 and to a 47 microfarad capacitor C8. When the system is initially turned on, or is reset, the silicon controlled rectifier SCR2 is in its non-conductive state, and the indicator light 16 is extinguished. Upon the first operation of the T-1 announcement mode, representing the first call received over the telephone line, the silicon controlled rectifier SCR2 is triggered by way of the resistor R37, so that the call light 16 is illuminated to indicate to the user that a call has been received. The capacitor C8 is provided to prevent transient operation of the silicon controlled rectifier SCR2, and the resistor R29 provides a current limit for the call light 16. The call light is extinguished by either removing power by turning off the switch S-1, or by moving the switch section 14D to the rewind position. Either of these operations places a ground short circuit on the positive side of the call light 16, thereby removing current from the silicon controlled rectifier SCR2 and allowing it to turn off.

The circuit of call light 16 also controls the automatic ring delay transistor Q8. When the call light 16 is extinguished, indicating that no calls have been received, the transistor Q8 is rendered conductive, so that both the capacitors C1 and C2 are placed in the ring delay circuit. When the call light 16 is illuminated, however, indicating that the first call has been received, the base voltage of the transistor Q8 becomes low, due to the voltage divider action of the resistors R38 and R39, so that the transistor becomes non-conductive, removing the capacitor C2 from the ring delay circuit.

The rewind operation for the message tape is effectuated, as described above, when the rewind solenoid SD-3 is energized, with the motor M-1 being energized in the same direction as for the T-1 and T-2 operating modes. This occurs when a ground is placed on the lower terminal of the solenoid coil SD-3, which is connected to the base of transistor Q6 through a 470 ohm resistor R28. A ground is placed on the lower terminal of the solenoid SD-3 when the switch section 14A is moved to the rewind position (R). This also causes the transistor Q6 to become conductive so that the motor M-1 is simultaneously energized, and the T-2 message tape is driven in the reverse direction.

An audio pre-amplifier stage is provided, which is composed of the circuit of a pair of NPN transistors Q15 and Q16. The emitter of the transistor Q15 is grounded, and its collector is connected to a supply voltage lead V+ through a 33 kilo-ohm resistor R72 and through a 10 kilo-ohm resistor R74. The junction of resistors R72 and R74 is connected to a 100 microfarad grounded capacitor C20. The collector of transistor Q15 is connected to the base of transistor Q16. The collector of transistor Q16 is connected to resistor R74 through a 22 kilo-ohm resistor R73. The emitter of transistor Q16 is connected to a grounded 5.5 kilo-ohm resistor R77.

The base of transistor Q13 is connected to a 1 kilo-ohm resistor R78 which is coupled through a 10 microfarad coupling capacitor C23 to the common terminal of switch section 14D. The emitter of transistor Q16 is connected to a 223 microfarad capacitor C21 which, in turn, is connected to resistor R78 through a 15 kilo-ohm resistor R75. The capacitor C21 and resistor R75 are shunted by a 100 kilo-ohm resistor R76. The collector of transistor Q16 is connected to a 10 kilo-ohm resistor R79 which, in turn, is connected to a grounded 152 microfarad capacitor C22 and to a 103 microfarad capacitor C24.

The input signal to the audio pre-amplifier is selected by the switch section 14D, and it is fed to the base of the transistor Q15 by way of the coupling capacitor C23 and resistor R78. Supply voltage to the audio pre-amplifier is filtered by the resistor R74 and capacitor C20. The collector of transistor Q15 is directly coupled to the base of transistor Q16. The resistor R76 from the emitter of transistor Q16 to the base of transistor Q15 completes the direct current closed loop, providing a stable operating point. The resistor R75 and capacitor C21 form a negative feedback circuit which provides the correct audio shaping for playback from either the T-1 to T-2 tape. The resistor R77 provides direct current stability, as well as alternating current negative feedback, to stabilize the gain of the audio pre-amplifier. The resistor R79 and capacitor C22 at the output of the audio preamplifier provide a low-pass filter to prevent high frequency oscillation.

The microphone jack 24 is connected to the R1 and R2 terminals of switch section 14D through a 334 microfarad capacitor C37. This capacitor is connected in series with the input impedance of the amplifier during the R1 or R2 recordings by the microphone 28. The resistance/capacitance network formed by capacitor C37 and the input impedance of the pre-amplifier, which is approximately 1500 ohms, exactly complement the negative feedback provided by the resistor R75 and capacitor C21, so that the audio response of the pre-amplifier is flat when recordings are made by the microphone 28 during either the Record 1 or Record 2 operation.

The basic audio amplifier is composed of an integrated circuit IC-1, and its associated components. The coupling capacitor C24 is connected to pin 2 of the integrated circuit. Pin 1 is connected to a grounded 10 microfarad capacitor C26. Pins 3, 4 and 5 are grounded. Pin 6 is connected to a 103 microfarad capacitor C27 which, in turn, is connected to a grounded 222 microfarad capacitor C25. Pin 7 is grounded, as are pins 10, 11 and 12. Pins 9 and 13 are open. Pin 14 is connected to the positive supply voltage lead V+. The output pin 8 of the integrated circuit IC-1 is connected through a coupling capacitor C30 of, for example, 10 microfarads to a grounded volume control potentiometer VR-1, the potentiometer being shunted by a 104 microfarad capacitor C32.

The output of the audio pre-amplifier is fed to input pin 2 of the audio amplifier integrated circuit IC-1, and two further isolated inputs are provided to the circuit by way of pins 1 and 6. The audio amplifier pin 2 receives its input from a beep tone oscillator, formed by the circuit of a transistor Q13, by way of a 220 kilo-ohm resistor R81 and a 103 microfarad coupling capacitor C28. The audio amplifier input pin 2 also receives an input from the telephone line by way of a 4.7 kilo-ohm resistor R80 which is connected through a diode D17 to a 10 microfarad coupling capacitor C11 which, in turn, is connected to transformer T2. The resistor R80 and capacitor C25 also form a low-pass filter to prevent high frequency oscillation in the audio amplifier. The capacitor C26 provides improved low frequency response and hum reduction for the integrated circuit IC-1.

The filtered supply voltage V+ is fed to the integrated circuit IC-1 by way of pin 18, and the audio amplifier output is taken from pin 8 of IC-1 by way of capacitor C30. The output is fed through capacitor C30 to the telephone line by way of a 1.5 kilo-ohm resistor R51 which is connected to a 10 microfarad capacitor C14. The capacitor C14, in turn, is connected to the coupling capacitor C11 through D18. Accordingly, the diode D17 passes the incoming audio signals from the telephone line to the audio amplifier of integrated circuit IC-1 during the T-2 message recording mode, whereas the diode D18 feeds the output signals from the audio amplifier to the telephone line during the T-1 announcement mode.

The output from the audio amplifier of integrated circuit IC-1 is also fed through a 22 kilo-ohm resistor R88 to the common terminal of switch section 14C, so that it may be fed to the record/reproduce heads RPH-1, RPH-2, which are respectively associated with the T-1 announcement tape and T-2 message tape respectively, when the selector knob 14 is turned to the R-1 or R-2 positions.

Supply voltage for the entire audio section is utilized by use of a capacitor multiplier circuit associated with NPN transistor Q17, in conjunction with capacitor C31. The emitter of transistor Q17 is connected to the voltage lead V+. Its collector is directly connected to the lead V+$_{cc}$ and through a 560 ohm resistor R82 to its base. The emitter is connected through a grounded 10 microfarad capacitor C29. The base of the transistor Q17 is supplied with a filtered current through the circuit of resistor R82 and capacitor C31. The ripple current at the emitter output of the transistor Q17 is proportional to the degree of filtering provided at its base. The resistor R82 is connected through a 10 kilo-ohm resistor R86 and a 30 kilo-ohm resistor R87 to the common terminal of the switch section 14C, the junction between the resistors being connected to a grounded 22 microfarad capacitor C34.

The circuit includes a speaker designated SP, which is mounted behind the grill 22 of the unit of FIG. 1. An integrated circuit designated IC-2, and its associated components, constitute a further audio amplifier for the speaker. The movable arm of the volume control potentiometer VR-1 is connected through a 22 kilo-ohm resistor R83 to pin 6 of the integrated circuit IC-2. Pin 1 is connected to a grounded 4.7 microfarad capacitor C33, pin 2 is connected to a grounded 1 kilo-ohm resistor R84, pins 3, 4 and 5 are directly grounded, pin 6 is also connected to a grounded 1 kilo-ohm resistor R88, pins 7, 10, 11 and 12 are also grounded, pin 8 is connected to a coupling capacitor C36 having a capacitance of 220 microfarads, and which is connected to one terminal of the speaker SP, the other terminal of the speaker being grounded. The terminal 8 is connected to a grounded 224 microfarad capacitor C33, terminal 9 and 13 are open, and terminal 14 is connected to the power lead V+.

Both input pins 2 and 6 of the integrated circuit IC-2, are grounded through equal resistors R84 and R85 to insure that the direct current output from pin 8 will remain at approximately one-half the supply voltage. Input to the amplifier is taken from the volume control VR-1. The resistors R83 and R85 form a voltage divider which reduces the input to the amplifier to an appropriate level. The filtered supply voltage is fed to the integrated circuit IC-2 by way of pin 14. The capacitor C35 is provided to eliminate high frequency oscillation. The capacitor C33, connected to pin 1, provides improved low frequency audio response and hum reduction. Pin 1 of the integrated circuit IC-2 is also connected to the collector of the transistor Q14, the circuit of which forms a speaker muting system to be described.

When the transistor Q14 is rendered non-conductive, the amplifier formed by the integrated circuit IC-2 operates normally. However, when the transistor Q14 is conductive, pin 1 of the integrated circuit IC-2 is short circuited to ground, so that the operation of the integrated circuit IC-2 is paralyzed and the speaker is silenced. The emitter of the transistor Q14 is grounded, and its base is connected to the junction of a pair of 4.7 kilo-ohm resistors R70 and R71. The resistor R71 is grounded, and the resistor R70 is connected to contact A.O of the switch section 14B. The base of the transistor Q14 is connected to contact P of switch section 14B. The resistor R71 provides thermal stability for the transistor Q14.

The transistor Q14 is rendered non-conductive, so as to permit operation of the speaker SP, only when the system is in the playback mode, in the T-2 message mode, or in the announce-only mode. In the playback mode, the base of the transistor Q14 is short-circuited directly to ground by the switch section 14B in its illustrated position, to that transistor Q14 is non-conductive. In the T-2 message recording mode, the transistor Q14 is also non-conductive because its drive is removed from both inputs to he "or" gate formed by resistor R70, and by a 3.3 kilo-ohm resistor R42. In the announce-only mode, the switch section 14B is shifted to the A.O contact, which short-circuits the junction of resistors R66 and R70 to ground, rendering the transistor Q14 non-conductive, so as to permit speaker operation during the announce only mode.

Therefore, as described above, muting is removed from the speaker circuit during the playback mode, so that the messages previously recorded on the message tape T-2 may be reproduced. Muting is also removed during the incoming message mode, so that the incoming messages may be monitored, if so desired; and in the announce only mode, during which the speaker may be operated during the T-1 announcement interval for monitoring purposes, but is muted during the standby condition.

Otherwise, during the T-1 mode the speaker is muted, since the resistor R70 receives its input by way of a 4.7 kilo-ohm resistor R66 which is connected through the resistors R20, R19 and R14 to the collector of transistor Q1, which is at a relatively high voltage during the T-1 mode, when the switch CS1 is opened; and resistor R42 receives its input by way of relay contact K1A, which is connected through the winding of transformer T2, and the contacts K1B to the high voltage lead V+$_{cc}$ when the relay K1 is de-energized.

The audio switching circuit is composed of the diode D17 and diode D18, and associated control circuitry. The diode D18 is effective to permit the passage of audio intelligence from the output of the audio amplifier integrated circuit IC-1 to the telephone line; whereas the diode D17 is effective to permit the incoming messages from the telephone line to be fed to the audio amplifier integrated circuit IC-1 for amplification.

The audio switching control circuit includes an NPN transistor Q9 whose emitter is grounded, and whose collector is connected to a grounded 4.7 kilo-ohm resistor R44 and through a 3.3 kilo-ohm resistor R41 to the relay contacts K1A. The collector of transistor Q9 is also connected to the junction of resistors R50 and R74 through a 1 kilo-ohm resistor R46, and to a grounded 10 microfarad capacitor C12. The relay contacts K1A are also connected to a grounded 3.3 kilo-ohm resistor R11. The base of transistor Q9 is connected to resistor R20 through a 6.8 kilo-ohm resistor R52. The collector of the transistor Q9 is also connected to an 820 ohm resistor R45 which, in turn, is connected to the junction of capacitor C11 and the diodes D17 and D18. This junction is also conneccted to a 6.9 kilo-ohm resistor R43. The cathode of the diode D17 is connected through a 1.5 kilo-ohm resistor R47 and through a 1.5 kilo-ohm resistor R50 to the voltage lead V+. The junction of these two resistors is connected to the junction of a ground 1.8 kilo-ohm resistor R49 and 3.3 kilo-ohm resistor R48. The resistor R49 is shunted by a 100 microfarad capacitor C13, and the resistor R48 is connected to the anode of the diode D18.

As mentioned above, during the T-1 announcement interval, the audio announcement on the T-1 tape, as amplified by the audio amplifier IC-1 is fed from the output of the amplifier to the telephone line through the diode D18. On the other hand, during the T-2 message recording mode, the message from the calling party is fed from the telephone line to the input of the audio amplifier integrated circuit IC-1 by way of the diode D17. The resistors R50 and R49 form a voltage divider network which supplies a voltage approximately midway between ground and the supply voltage V+ to the diodes D17 and D18. Capacitor C13 filters this voltage and provides a very low alternating current impedance feedback around the integrated circuit IC-1 by way of the resistors R47 and R48. The cathode of the diode D17 and the anode of the diode D18 are biased by the divided V+ voltage by way of the resistors R47 and R48 respectively. The anode of the diode D17 and the cathodoe of the diode D18 are both connected to the telephone line through the capacitor C11 and transformer T2.

When the transistor Q9 is non-conductive, filtered voltage is fed by way of the resistors R46 and R46 to the junction of the two diodes D17 and D18. When the transistor Q9 is non-conductive, the filtered voltage V+ is fed to the junction of the diodes D17 and D18 by way of the resistors R46 and R45. This voltage causes the diode D17 to be forward biased to its conductive state, and the diode D18 to be reversed biased to its non-conductive state, thus allowing the audio signals to be fed only from the telephone line to the input of the audio amplifier IC-1. This condition obtains during the T-2 message recording mode.

On the other hand, when the transistor Q9 is rendered conductive, the junction of the diodes D17 and D18 is short-circuited to ground by way of the resistor R45 and transistor Q9. This latter action causes the diode D18 to be forward biased to its conductive state, and the diode D17 to be reversed biased to its non-conductive state, thus allowing the audio signals to be fed only from the output of the audio amplifier integrated circuit IC-1 to the telephone line. The latter condition obtains during the T-1 announcement mode.

The capacitor C12 provides a very low alternating current impedance, such that the secondary of the transformer T2 always sees a constant 820 ohms (resistor R45) in parallel with the other resistance in the circuit. Resistor R44 provides thermal stability for the transistor Q9. The transistor Q9 receives its base drive from an "or" gate formed by the resistors R41 and R52. The resistor R41 receives its input by way of relay contacts K1A, transformer T2, and relay contacts K1B, when the relay K1 is de-energized. The resistor R52, on the other hand, receives its input from the collector of the transistor Q1 during the T-1 announcement interval.

In this way, the transistor Q9 is rendered non-conductive only when the relay K1 is energized, but here is no voltage at the collector of the transistor Q1, which occurs only during the incoming message record mode T-2. In all other modes, the audio switching network of transistor Q9 is held in the "outgoing" position to assure that no unwanted audio signals from the telephone line will enter the audio amplifier.

The circuit of the NPN transistor Q13 forms the "beep" oscillator. The collector of the oscillator is connected through a 3.3 kilo-ohm resistor R65 and 1 kilo-ohm resistor R64 to the positive power lead V+$_{cc}$. The collector is also connected to the base through a pair of 47 kilo-ohm resistors R67 and R68. The emitter of the transistor Q13 is connected through a diode D19 to the collector of transistor Q9. The resistors R67 and R68 are shunted by a pair of 0.0022 microfarad capacitors C17 and C18. The junction of the resistors R67 ad R68 is connected to a 0.01 microfarad grounded capacitor C19, and the junction of the capacitors C17 and C18 is connected to a grounded 10 kilo-ohm resistor R69. The junction of resistors R64 and R65 is connected to a grounded 33 microfarad capacitor C16. The resistors R67, R68 and R69, together with the capacitors C17, C18 and C19 form a "bridged tee" feedback network which provides positive feedback at only one frequency from the collector to the base of the transistor Q13. With the aforesaid described parameters, this frequency is of the order of 1200 cycles.

The resistor R64 and capacitor C16 form a supply filter so that no ripple is present at the oscillator during the idle conditions. The resistor R65 is the collector load for the oscillator. The output is taken from the collector of the transistor Q13 and is fed by way of a 103 microfarad capacitor C28 and resistor R81 to the input of the audio amplifier integrated circuit IC-1. The output of the oscillator is amplified by the audio amplifier and fed to the telephone line at the conclusion of the T-1 announcement mode, and continues for a preset time of approximately one-half second. This is accomplished by using a Schmitt trigger circuit formed by a pair of transistors Q10 and Q-11, and a timer circuit composed of a 47 microfarad capacitor C15 and a 58 kilo-ohm resistor R55.

The capacitor and resistor are both grounded, and connected to the junction of a pair of 10 kilo-ohm resistors R53 and R54. The resistor R54 is connected to the base of the transistor Q10, and the resistor R53 is connected to the junction of resistors R52 and R66. The emitter of the transistor Q10 is connected to the emitter of the transistor Q11, and to a common 56 ohm grounded resistor R58. The collectors of the transistors Q10 and Q11 are connected to the positive lead V+$_{cc}$ through resistors R56 and R61. The resistor R56 has a resistance of 1.5 kilo-ohms, and the resistor R61 has a resistance of 3.3 kilo-ohms. The collector of the transistor Q10 is connected to the base of the transistor Q11 through a 4.7 kilo-ohm resistor R57, and the base of the latter transistor is connected to the emitters through a 4.7 kilo-ohm resistor R60. The junction of resistors R57 and R60 is connected to the junction of resistors R52 and R66 through a 4.7 kilo-ohm resistor R59. The collector of the transistor Q11 is connected through a 3.3 kilo-ohm resistor R62 to the base of a grounded emitter NPN transistor Q12. The base of the latter transistor is connected to a grounded 1 kilo-ohm resistor R63, and its collector is connected to the emitter of transistor Q13.

During the T-1 announcement mode, when the switch CS1 is open, a high voltage appears at the junction of resistor R53 and resisitor R20, and the capacitor C15 is charged to render the transistor Q10 conductive. Transistor Q11 would normally be rendered non-conductive by this action, however, it continues to receive a base drive voltage by way of resistor R59 from the junction of resistors R20 and R33. Therefore, the transistor Q11 remains conductive for the duration of the announcement interval, and until the completion of the announcement interval when the switch CS1 closes to remove the voltage from the resistor R59. When that occurs, the transistor Q11 is immediately rendered non-conductive, thereby supplying a base drive voltage to the transistor Q12 by way of the resistors R61 and R62, so that the transistor Q12 is rendered conductive. When the transistor Q12 is conductive, it short-circuits the emitter of transistor Q13 to ground, allowing the "beep" tone oscillator to operate.

The diode D19 also provides a path from the collector of the transistor Q12 to the collector of the transistor Q9 to assure that the audio switching network will be held in the outgoing mode for the duration of the "beep" tone, so that the tone will be transmitted over the telephone line and heard by the calling party. When the charge on the capacitor C15 diminishes sufficiently, the transistor Q10 will be rendered non-conductive, thereby rendering the transistor Q11 conductive which, in turn, renders the transistor Q11 non-conductive and terminates the generation of the "beep" tone. The resistor R63 provides thermal stability of for the transistor Q12.

Signals to be recorded on the T-2 tape and T-1 tape are fed to the switch section 14C from the output of the audio amplifier integrated circuit IC-1, and specifically to the common contacts of the switch section 14C. The switch section 14C selects the appropriate head RPH-1 or RPH-2 to which the recording signals will be fed for a given mode. In the playback, rewind and announce-only modes, no recording is required, so that the output from the audio amplifier integrated circuit IC-1 is short-circuited to ground for the Playback, Rewind and Answer positions of the switch section 14C. In the Answer and Record 2 positions of switch section 14C, the recording signals from the audio amplifier integrated circuit IC-1 are fed to the record/playback head RPH-2. In the Record 1 position of switch section 14C, the output signals from the audio amplifier integrated circuit IC-1 are fed to the record-playback head RPH-1.

The output signals for heads RPH-1, RPH-2 are taken from pin 8 of the integrated circuit IC-1 by way of the resistor R88. The resistance of resistor R88 and the impedance of the selected head reduce the audio signals to the required level. Direct current bias is received by way of the resistor R87. Bias current is taken from the base of the transistor Q17, and is furhter filtered by the resistor R86 and capacitor C34. The control of the signals to the heads RPH-2 and RPH-1 is effectuated through relay contacts K201A and K301A respectively which are operated by remote control circuits, such as described in copending applications Ser. No. 562,975, filed Mar. 28, 1975 and Ser. No. 581,842, filed May 29, 1975. During normal operation, the signals pass to the record/playback head through normally closed contacts K201A and K301A respectively.

The erase heads EH-1 and EH-2, which are respectively associated with the T-1 tape and T-2 tape are controlled by the switch sections 14A and 14B. Supply voltage for the erase heads is provided by the resistor R30 from the V+$_{cc}$ line, and is filtered by the capacitor C1. Operation of the appropriate erase head is achieved by connecting the other terminal of the selected head to ground. Operation of the erase head EH-1 is required only during the Record 1 mode, and for this mode, the terminal of the head EH-1 is grounded by way of the switch section 14A. Operation of the erase head EH-2 is required during the Answer and Record 2 modes, and this action is achieved by the switch section 14B directly during the Answer mode, and by way of diode D20 in the Record 2 recording mode.

The invention provides, therefore, an improved telephone answering system which is inherently simple in its construction, and yet which incorporates specific novel features which are not to be found in the more highly complex and expensive systems.

While a particular embodiment of the invention has been shown and described, modifications may be made. It is intended in the claims to cover the modifications which fall within the spirit and scope of the invention.

What is claimed is:

1. In a telephone answering system which includes, input circuit means to be coupled to a telephone line to respond to telephone messages received over the telephone line, a message magnetic tape recording means, and control circuit means responsive to a predetermined voltage level to activate the announcement magnetic tape storage means and cause a recorded announcement to be transmitted to a calling party during a first time interval (T-1), and for switching the system into a message receiving mode at the end of the first time interval to permit a message from the calling party to be recorded on the message recording tape, the combination of: ring-detecting means coupled to said input circuit means and responsive to ring signals received over the telephone line to produce a voltage pulse in response to each such ring signal; resistance-capacitive integrating means coupled to the ring-detecting means for integrating the voltage pulses produced thereby until the predetermined voltage level is reached so as to cause the announcement storage means to be activated after a first predetermined number of ring signals have been received over the telephone line; and further circuit means responsive to the first activation of the announcement storage means by the integrating means to change the capacitive value of the integrating means, so that the integrating means cuases each subsequent activation of the announcement storage means to occur after a second predetermined number of ring signals, less than said first predetermined number have been received over the telephone line.

2. The combination defined in claim 1, in which said further circuit means includes capacitor means and switching circuit means for selectively switching the capacitor means into circuit with said integrating means.

3. The combination defined in claim 1, and which includes oscillator means for generating a beep tone at the end of the first time interval; capacitor means included in the oscillator means; and switching means included in the control circuit means to switch the capacitor means to a potential source during the first time interval to charge the capacitor, and for disconnecting the capacitor means from the source at the end of the first time interval and for activating the oscillator means so as to cause the oscillator means to oscillate and generate the beep tone for the duration of the charge on the capacitor means.

* * * * *

REEXAMINATION CERTIFICATE (1061st)
United States Patent [19]
Darwood

[11] B1 3,979,560
[45] Certificate Issued May 30, 1989

[54] TELEPHONE ANSWERING SYSTEM WITH RING DETECTOR

[75] Inventor: James R. Darwood, Cerritos, Calif.

[73] Assignee: J.A.D. Avanti, Inc., Paramount, Calif.

Reexamination Request:
No. 90/001,550, Jul. 8, 1988

Reexamination Certificate for:
Patent No.: 3,979,560
Issued: Sep. 7, 1976
Appl. No.: 556,649
Filed: Mar. 10, 1975

Related U.S. Application Data

[63] Continuation-in-part of Ser. No. 482,452, Jun. 24, 1974, abandoned.

[51] Int. Cl.$^4$ .............................................. H04M 1/64
[52] U.S. Cl. .......................................... 379/82; 379/73
[58] Field of Search ...................... 379/74, 77, 79, 80, 379/81, 82, 73, 376

[56] References Cited
U.S. PATENT DOCUMENTS

| | | | |
|---|---|---|---|
| 3,337,690 | 8/1967 | Martin | 379/77 |
| 3,376,390 | 4/1968 | Hashimoto | 379/80 |
| 3,592,968 | 7/1971 | Ogawa | 379/73 |
| 3,679,831 | 7/1972 | Bonsky | 379/376 |

FOREIGN PATENT DOCUMENTS

| | | | |
|---|---|---|---|
| 41-8523 | 5/1966 | Japan | 379/80 |
| 483273 | 5/1966 | Japan | 379/80 |

*Primary Examiner*—Aristotelis M. Psitos
*Attorney, Agent, or Firm*—Harris, Kern, Wallen & Tinsley

[57] ABSTRACT

A telephone answering system is provided which includes an automatic ring delay circuit which sets the system so that the first call received after the system has been turned on requires four rings, for example, to activate the system, and all subsequent calls require but two rings, for example. The telephone answering system also includes an oscillator circuit which is momentarily energized at the end of an announcement interval so as to generate a beep signal to the calling party to notify the calling party that the system is now in condition to record his message.

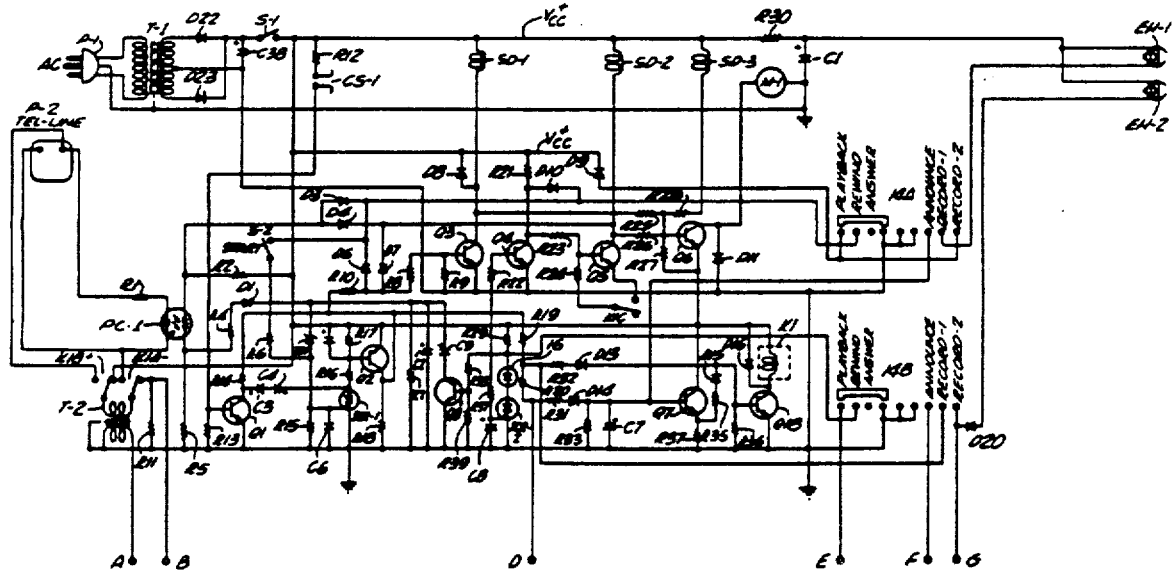

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2 and 3, dependent on an amended claim, are determined to be patentable.

1. In a telephone answering system which includes, input circuit means to be coupled to a telephone line to respond to telephone messages received over the telephone line, a message magnetic tape recording means, and control circuit means responsive to a predetermined voltage level to activate [the] *an* announcement magnetic tape storage means and cause a recorded announcement to be transmitted to a calling party during a first time interval(T-1), and for switching the system into a message receiving mode at the end of the first time interval to permit a message from the calling party to be recorded on the message recording tape, the combination of:

ring-detecting means coupled to said input circuit means and responsive to ring signals received over the telephone line to produce a voltage pulse in response to each such ring signal;

resistance-capacitive integrating means coupled to the ring-detecting means for integrating the voltage pulses produced thereby until the predetermined voltage level is reached so as to cause the announcement *magnetic tape* storage means to be activated after a first predetermined number of ring signals have been received over the telephone line; and further circuit means responsive to the first activation of the announcement *magnetic tape* storage means by the integrating means to *automatically* change the capacitive value of the integrating means, so that the integrating means causes each subsequent activation of the announcement *magnetic tape* storage means to occur after a second predetermined number of ring signals, less than said first predetermined number have been received over the telephone line.

* * * * *